US012297899B2

(12) United States Patent
Ziemba et al.

(10) Patent No.: US 12,297,899 B2
(45) Date of Patent: May 13, 2025

(54) HEAT EXCHANGE MODULE

(71) Applicant: Rivian IP Holdings, LLC, Plymouth, MI (US)

(72) Inventors: Jefferey R. Ziemba, Novi, MI (US); Eric Sharkness, Canton, MI (US); Jaymes M. Wainright, Livonia, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 225 days.

(21) Appl. No.: 18/087,221

(22) Filed: Dec. 22, 2022

(65) Prior Publication Data

US 2024/0209932 A1  Jun. 27, 2024

(51) Int. Cl.
*F28F 19/00* (2006.01)
*F16H 57/04* (2010.01)
*F28D 21/00* (2006.01)

(52) U.S. Cl.
CPC ......... *F16H 57/0417* (2013.01); *F28D 21/00* (2013.01); *F28D 2021/0089* (2013.01)

(58) Field of Classification Search
CPC ................. F16H 57/0417; F28D 21/00; F28D 2021/0089
USPC .......................................................... 165/141
See application file for complete search history.

(56) References Cited

U.S. PATENT DOCUMENTS

| 9,587,532 B1* | 3/2017 | Au | F01M 5/002 |
| 10,690,234 B1* | 6/2020 | Oury, Jr. | B60K 11/02 |
| 2021/0129660 A1* | 5/2021 | Bradfield | F16N 7/38 |

FOREIGN PATENT DOCUMENTS

CN    113227546 B  *  9/2022

* cited by examiner

*Primary Examiner* — Davis D Hwu
(74) *Attorney, Agent, or Firm* — BAKERHOSTETLER

(57) ABSTRACT

Disclosed are embodiments generally directed to a heat exchange system comprising a heat exchange module (HEM) that is strategically positioned within the vehicle and supports a combined lubrication system providing lubrication functionality for the vehicle. The HEM is positioned between an inverter and a gear box within the example electric vehicle. The HEM includes a plurality of ports and corresponding passages for coolant flow and oil flow.

20 Claims, 10 Drawing Sheets

HEAT EXCHANGE MODULE

INTRODUCTION

Vehicles may include lubrication system components in various corresponding dedicated spaces. It may be advantageous for lubrication system components to be configured to function within a fixed and limited space.

SUMMARY

Various aspects of the technology described herein are generally directed to, among other things, a heat exchange system comprising a heat exchange module (HEM) that is positioned between an inverter of a vehicle and a gear box of the vehicle. The heat exchange system can serve both as (1) an enclosure storing an HEM assembly; and (2) a structural support member between two output shafts associated with two tires, such as the front two tires.

The HEM may further be located between an inverter and a gearbox within the interior space of a vehicle. The HEM comprises a plurality of passages which include two coolant inlets, one coolant outlet, one oil inlet and two oil outlets. The disclosed embodiments provide a space-efficient system for maintaining structural support (e.g., maintaining structural functions to improve vehicle dynamics) of the vehicle and for housing an HEM assembly in a designated space. The heat exchange system is strategically positioned within the vehicle and supports a combined lubrication system (e.g., cooling and oil ports and passages) providing lubrication functionality for the vehicle. Additionally, the configuration of the HEM disclosed herein allows the HEM to be more compact than in previous configurations, as a heat exchange module would have ordinarily been duplicated for each side of the vehicle. By providing the disclosed six port design, the cost associated with manufacturing and maintaining a heat exchange system within a vehicle may be decreased as fewer parts may be needed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE DISCLOSED SUBJECT MATTER

Figure 1:
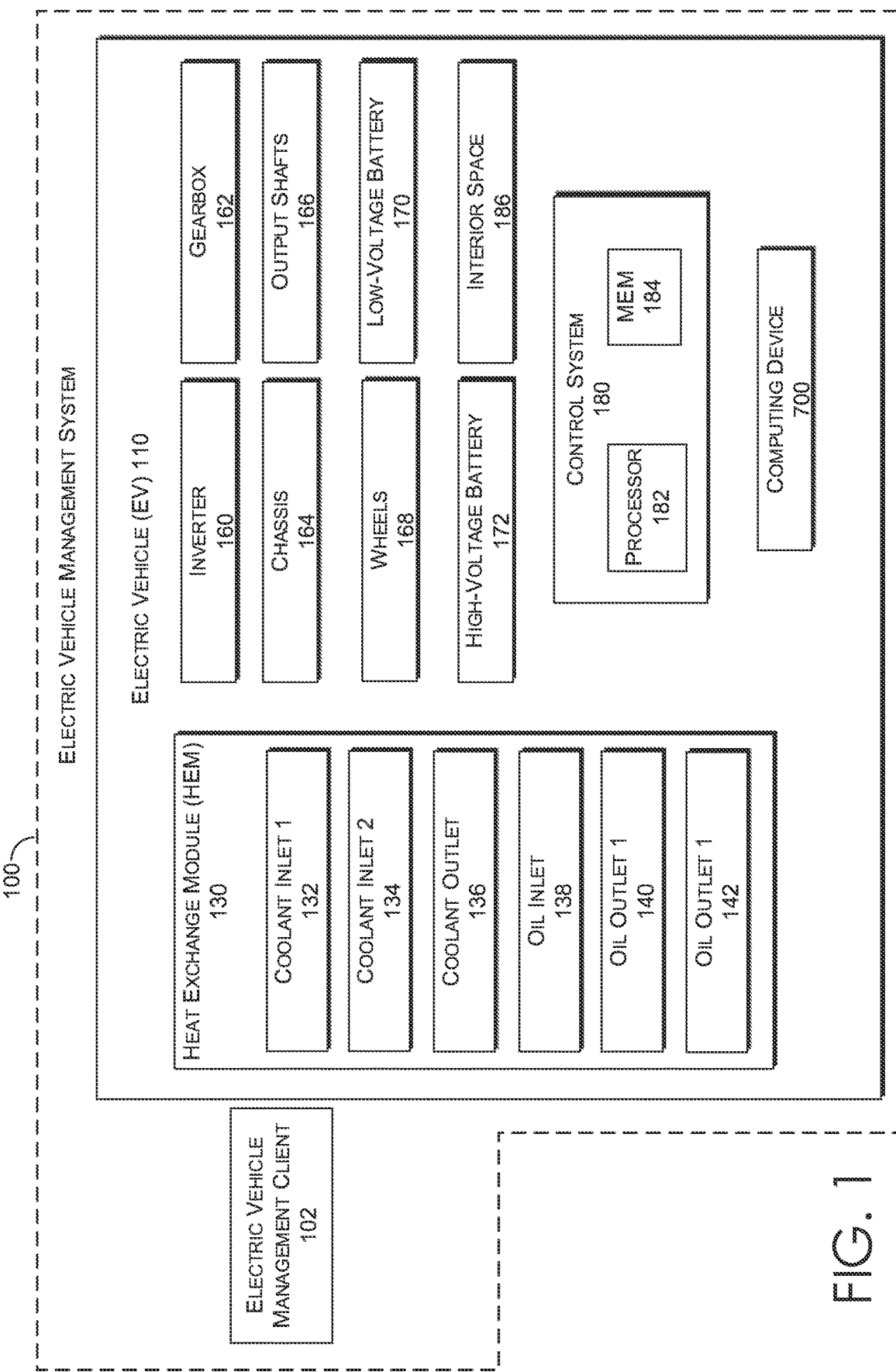
FIG. 1 is a block diagram of an exemplary schematic of an electric vehicle (EV) that includes a heat exchange module (HEM), in accordance with aspects of the technology described herein.

Vehicle drivers rely on vehicles to provide transportation. To provide transportation-related functionality, vehicles typically include any number of power components in various corresponding dedicated spaces, such as under the hood, under the vehicle seats, within the body of the vehicle, and so forth. As an example, electric vehicles may include a battery, a cooling system, an electric motor, a controller, a direct current to direct current converter, an alternating current to direct current converter, and a direct current to alternating current converter, to name a few.

Electric vehicles typically include a number of lubrication system components (e.g., cooling and oil flow components) in various corresponding dedicated spaces. It may be advantageous to configure such lubrication system components to function within spaces which are often fixed and of limited size.

One approach is to configure the lubrication system so that the heat exchange system maximizes optimal space utilization of the components in the vehicle while maintaining structural integrity of the vehicle.

With this in mind, aspects of the disclosed embodiments include, among other things, a Heat Exchange Module (HEM) that operates as a manifold to combine coolant fluid flow from two locations connected to one or more inverters of the vehicle. The heat exchange module supports oil flow that is, for example, split into two sides of a drive unit which has two motors. Advantageously, the split path of the oil flow lowers pressure drops and increases performance. To determine frictional losses in pipes, using the Darcy-Wiesbach equation, the determined pressure drop in a pipe is proportional to the volumetric flow squared and the length of the pipe to the first order. By splitting the flow in half (half to each side of the HEX), it reduces the pressure drop across the device, and by halving the length the pressure drop is further reduced. The lower pressure drop across the component results in a more efficient system as it requires less power to pump the oil through the lubrication system. In this manner, aspects of the disclosed embodiments provide a space-efficient system for maintaining structural functions to improve vehicle the function of the heat exchange system.

Additionally, the HEM may provide structural support (e.g., maintaining structural functions to improve vehicle dynamics) in a vehicle, such as an electric vehicle. The heat exchange system can serve both as (1) an enclosure storing components of the HEM system and (2) a member that maintains structural functions to improve vehicle dynamics. In one embodiment, the HEM is positioned between a two outputs shafts associated with two tires, such as the front two tires. In certain embodiments disclosed herein, the "HEM assembly" refers to a collection of electronic or power components, magnetic components, and/or cooling components of the vehicle (e.g., electric vehicle). Example components may include cooling fluid, a fluid flow path, a controller, a direct current to direct current converter, an alternating current to direct current converter, and a direct current to alternating current converter, a printed circuit board (PCB), a connector, and/or a relay, to name a few. Although certain embodiments of the HEM assembly are discussed in the context of having certain electronic or power components, magnetic components, and/or cooling components, it should be understood that the HEM is not limited to such components, since in some embodiments the HEM may include any additional or alternative suitable vehicle components.

In certain embodiments disclosed herein, the "chassis" refers to the base frame or body framework of the vehicle. The HEM may be positioned between the output shafts of the vehicle and may abut the chassis of the vehicle. In certain embodiments, the HEM includes a top cover, a bottom cover, and a housing that forms the enclosure housing an HEM assembly. In these embodiments, the housing forms the lateral and longitudinal sides of the enclosure, and the top cover forms the top side of the enclosure. Additionally, the HEM is positioned between the inverter and the gearbox within the electronic vehicle. In aspects, the HEM is coupled to the inverter and gearbox such that the HEM remains in place between the inverter and gearbox. It is contemplated that the HEM may be removably or permanently coupled to the inverter and gearbox. Further, it is contemplated that the HEM may also not be coupled to the inverter and gearbox in some aspects and be freestanding.

Aspects of the technical solution can be described by way of examples and with reference to FIGS. 1-7. FIG. 1 illustrates an EV management system 100 that includes an electric vehicle management client 102 and an electric vehicle (EV) 110. As used herein, "electric vehicle management client" 102 may refer to a personnel or user who engages with the EV 110 and/or the corresponding components. By way of non-limiting examples, the electric vehicle management client 102 may include a driver of the EV 110, a passenger of the EV 110, a station manager of a charging station, a service personnel, maintenance personnel, and any other person that may interact with the EV 110. Moreover, although certain embodiments discussed herein are discussed in the context of an EV 110, it should be understood that aspects of the embodiments disclosed herein may apply to a hybrid vehicle, a vehicle powered by fuel, or any other vessel capable of transporting passengers and/or cargo.

The EV 110 may include an interior space that includes a Heat Exchange Module (HEM) 130. For example, the interior space can be positioned within the body of the vehicle, in front of a cabin of the vehicle, above the chassis, and medially-inward relative to the two output shafts 166. In one embodiment, the interior space is large enough to accommodate the HEM 130. As discussed above, the HEM 130 is an enclosure that acts as a manifold to combine coolant flow from two locations associated with one or more inverters of the vehicle. The heat exchange module supports the flow of lubricant that is, for example, split into two sides of a drive unit which has two motors. The HEM 130 may include a coolant inlet 1 (132), a coolant inlet 2 (134), a coolant outlet (136), and oil inlet (138) and an oil outlet 1 (140) and oil outlet 2 (142). The HEM 130 may include a top lid cover and a bottom lid cover (not shown) in which the HEM 130 components are housed. In this manner, the top lid cover, a bottom lid cover, and associated housing may form the enclosure of the HEM 130.

The HEM 130 can serve both as (1) an enclosure storing HEM 130 components 132, 134, 136, 138, 140, and 142 and (2) a structural support member between two output shafts 166 that abuts a chassis 164. While FIG. 1 illustrates the coolant inlets, coolant outlet, oil inlet, and oil outlets, it is contemplated that in other embodiments, the HEM 130 may comprising additional or fewer components. Additional example components of the HEM 130 may include cooling fluid, a fluid flow path, a controller, a direct current to direct current converter, an alternating current to direct current converter, and a direct current to alternating current converter, a printed circuit board (PCB), a connector, and/or a relay, to name a few.

The components of the HEM 130 may be wired and connected to a low-voltage battery 170 and/or a high-voltage battery 172. For example, a cord connects a converter (e.g., a direct current to alternating current converter) of the HEM 130 to the low-voltage battery 170 and/or the high-voltage battery 172. The low-voltage battery 170 may correspond to a power source that provides power to vehicle components, such as the windshield wipers, the radio, and/or other on-board devices, even when the vehicle is powered off. In one embodiment, the low-voltage battery 170 is a 12-volt (v) battery. The high-voltage battery 172 may correspond to a rechargeable battery used to power an electric motor of the EV 110. In one embodiment, the high-voltage battery 172 includes any suitable battery pack module, such as battery packs including lithium-iron phosphate (LFP) battery cells, high-nickel battery cells, lithium-ion battery cells, sodium nickel chloride (e.g., "Zebra") battery cells using molten sodium chloraluminate, and the like. The high-voltage battery may include a deep-cycle battery or any suitable battery having a power-to-weight ratio, a specific energy, and an energy density that is higher than a starting, lighting, and ignition (SLI) battery.

The EV 110 may include a control system 180 that includes a processor 182 and a memory device 184. The control system 180 may be integral to the HEM 130 or separate and external to the HEM 130. Alternatively, certain components of the control system may be integral or within the HEM 130, while other components are separate from or external to the HEM 130. A detailed discussion of the processor 182 may be found below with respect to the processor 714 of FIG. 7, and a detailed discussion of the memory device 184 may be found below with respect to the memory 712 of FIG. 7. In one embodiment, the control system 180 includes computer logic to control operations of the components of the HEM 130 or other components of the EV 110, such as those depicted in FIG. 7. It should be understood that the control system 180 may include any additional or alternative control logic to facilitate efficient operations of the EV management system 100.

Figure 2A:
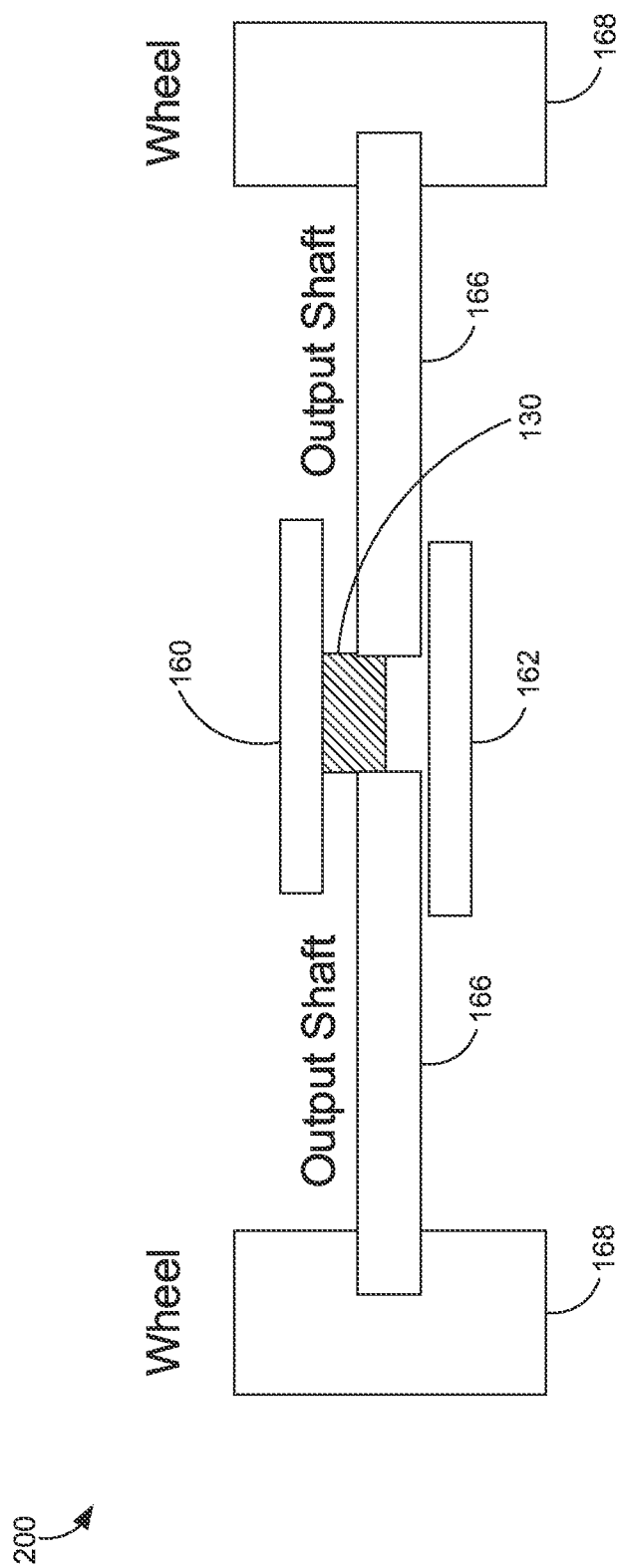
FIG. 2A is a schematic diagram of an example HEM positioned between two output shafts, in accordance with aspects of the technology described herein.

Turning to FIG. 2A which illustrates a simplified diagram 200 of the HEM 130 positioned between two output shafts 166. In one embodiment, the HEM 130 is defined between two output shafts 166 which are each connected to, for example, a wheel 168. As shown, the HEM 103 is positioned below an inverter 160 and above a gearbox 162. However, it is contemplated that an HEM, such as HEM 130, may be used in devices other than vehicles and may be located in alternate locations and configurations. A HEM may be used in other machines or devices that include a motor and an inverter. While not shown in FIG. 2A, the HEM 130 includes coolant inlet 1 (132), coolant inlet 2 (134), coolant outlet 136, oil inlet 139, oil outlet 1 (140) and the oil outlet 2 (142).

HEM 130 shown in FIG. 2A may be configured to reduce costs associated with manufacture and provide a more efficient and effective lubrication system for the EV 110. The strategic placement of HEM 130 provides an efficient lubrication system, allowing for both coolant and oil ports and passages, for the EV 110. The configuration described may decrease the number of passages, ports, and other components necessary. Additionally, the positioning the HEM 130 as shown in FIG. 2A to be located below the inverter and above a gearbox vertically and between the two output shafts maximizes space utilization within the EV. The HEM 130 may be removably or permanently coupled to the inverter and gearbox. Further, it is contemplated that the HEM 130 may also not be coupled to the inverter and gearbox in some aspects and be freestanding.

Figure 2B:
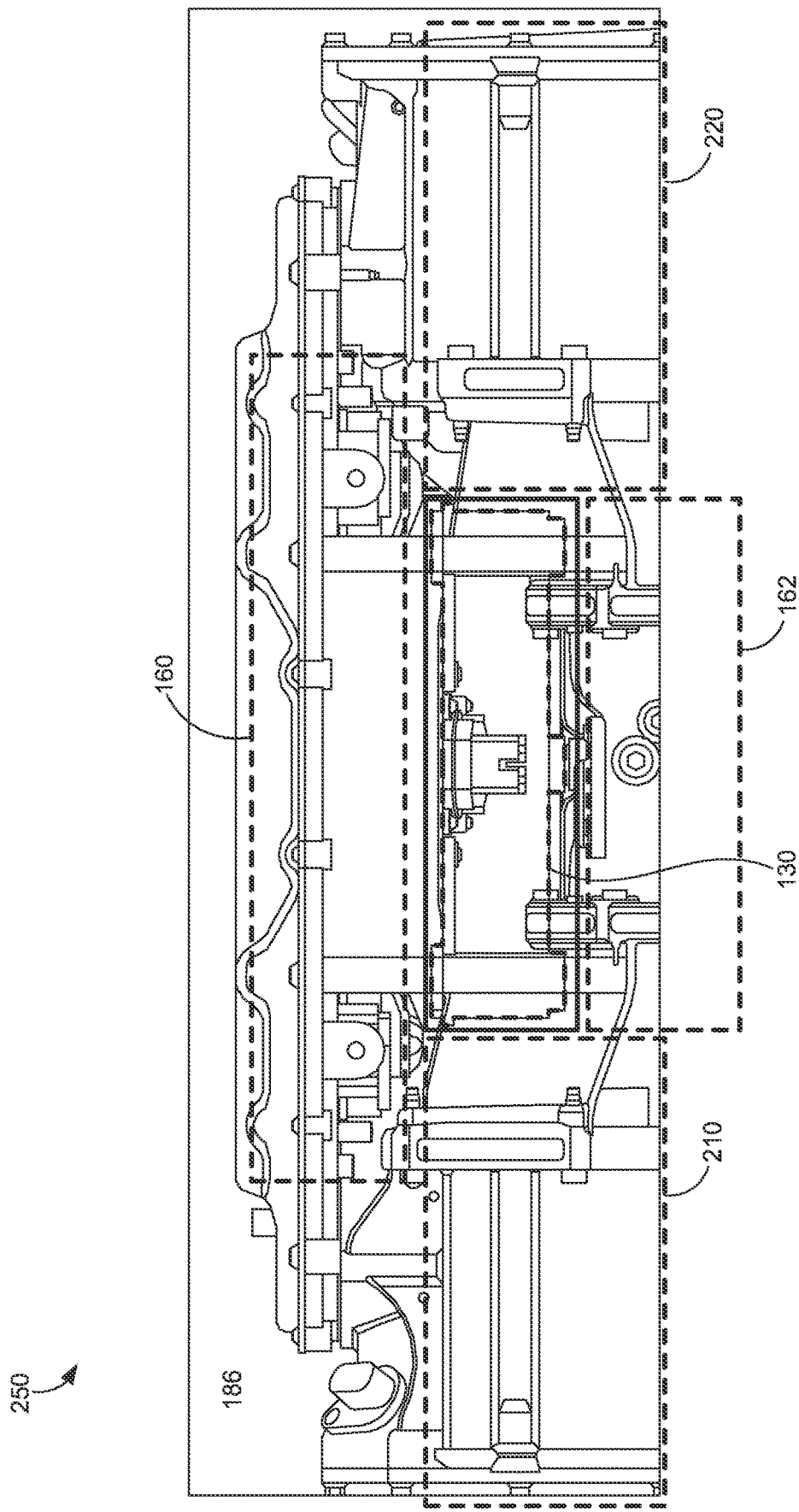
FIG. 2B is a detailed schematic diagram of an example EV comprising an HEM, in accordance with aspects of the technology described herein.

Turning to FIG. 2B, a detailed schematic diagram 250 of an example EV 110 having an HEM 130 located below the inverter 160 and above the gear box 162 is illustrated. In this detailed diagram 250, various other components that may be found within EV 110 are illustrated. The components are illustrated generally to show that the EV 110 comprises several components surrounding the HEM 130. At the top of FIG. 2B, the inverter 160 is shown. The HEM 130 is positioned below the inverter 160 and above the gearbox 162. The inverter 160 functions by converting direct-current (DC) power to alternating-current (AC) power.

The gearbox 162 may include the transmission of the vehicle and includes a system of different gears. The HEM 130 can provide both cooling and heating effects to the gearbox 162 when the EV 110 is in use. For example, in instances when the outside temperature is very cold, the HEM 130 warms the gearbox 162 in order to ensure that the gearbox 162 runs properly. By contrast, when the outside temperatures are very hot, the HEM 130 cools the gearbox 162.

Electric motors 210 and 220 are shown distal to the gear box 162, which include various components and also provide connection to the wheels of the EV 110. As discussed, the location of the HEM 130 may allow for reduction in packaging within the vehicle.

Figure 3A:
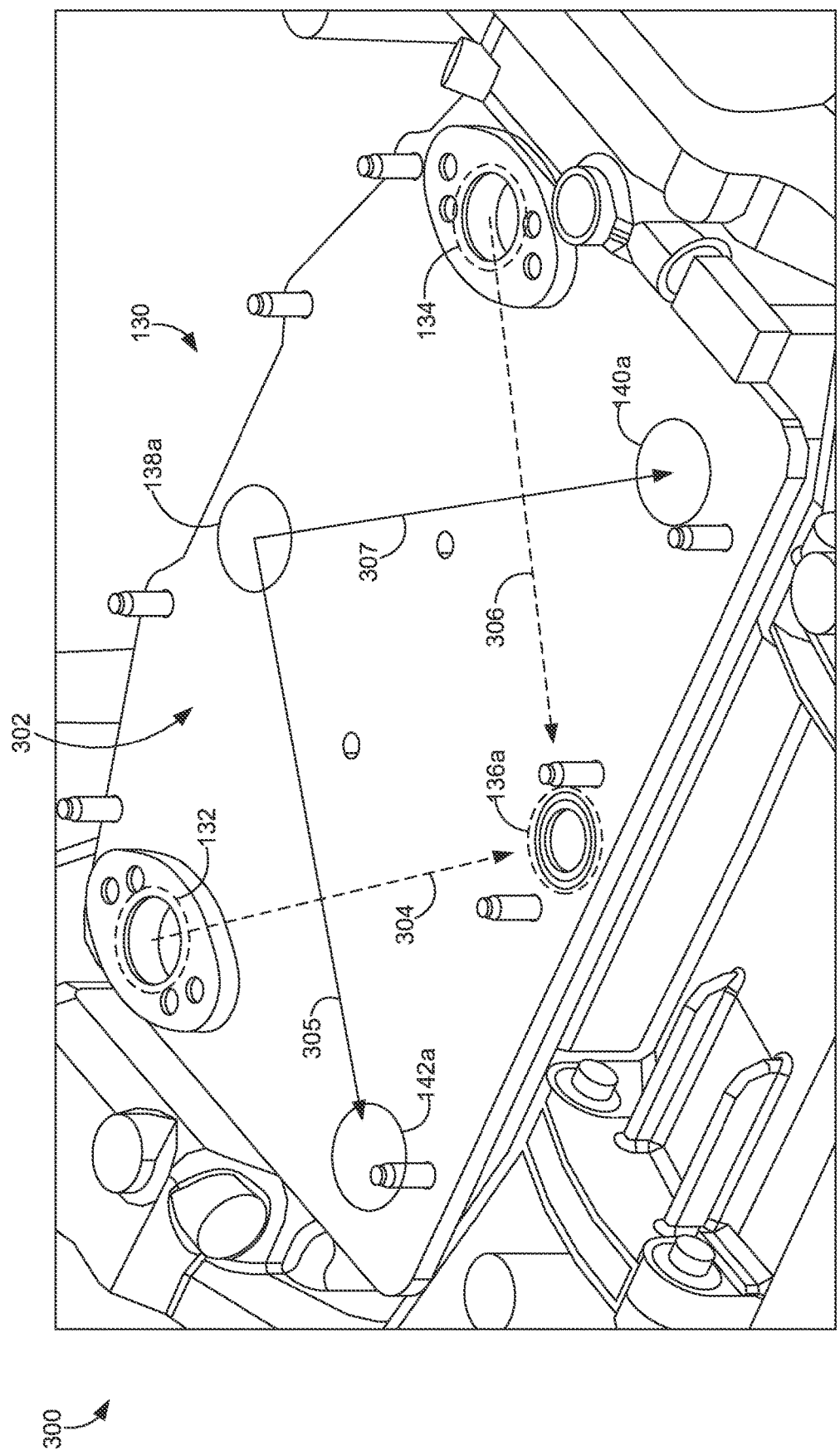
FIG. 3A is a schematic diagram of an top view of an example HEM comprising two coolant inlets and one coolant outlet, in accordance with aspects of the technology described herein.
Figure 3B:
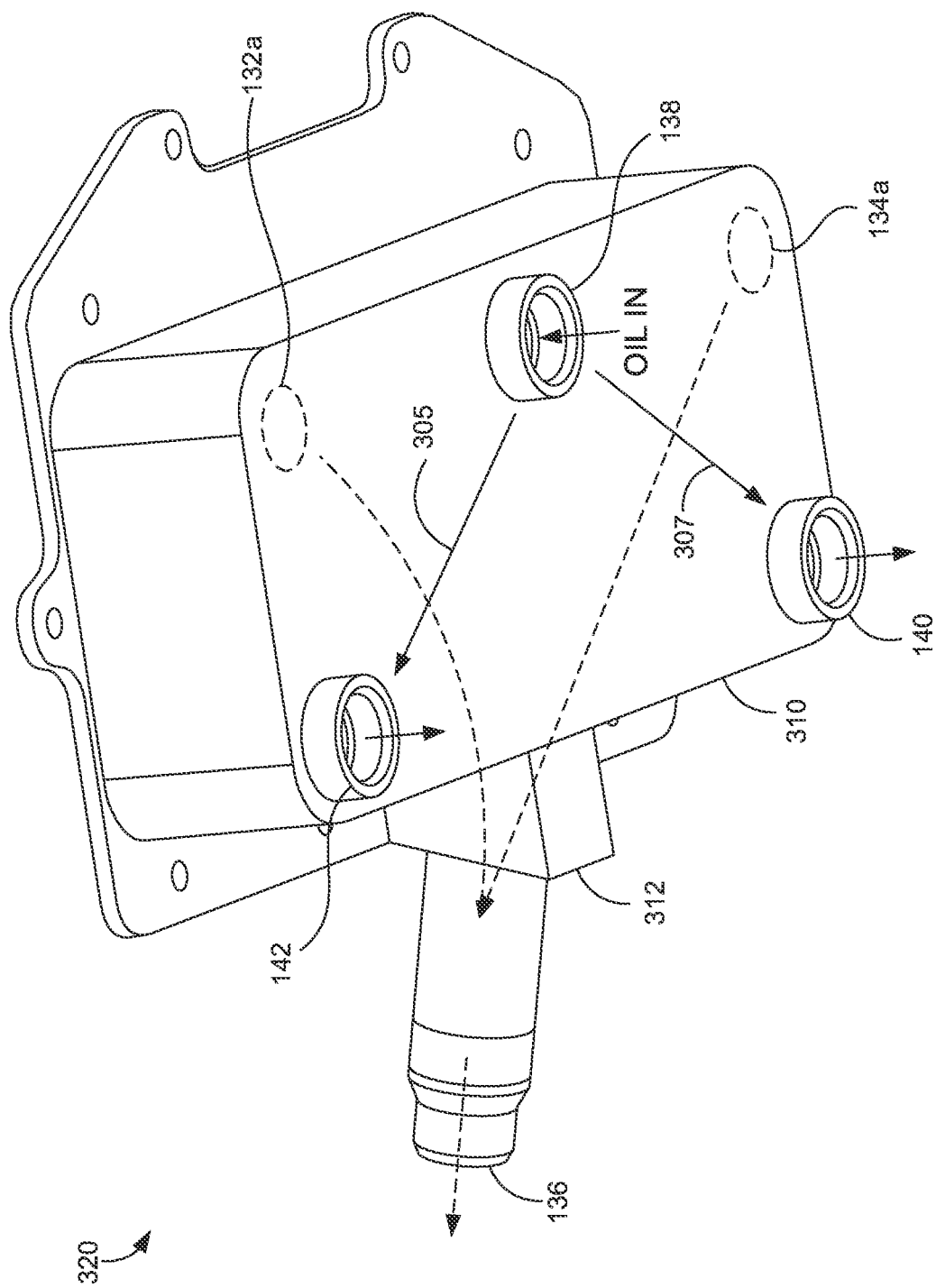
FIG. 3B is a schematic diagram of a bottom perspective view of an example HEM comprising one oil inlet and two oil outlets, in accordance with aspects of the technology described herein.
Figure 3C:
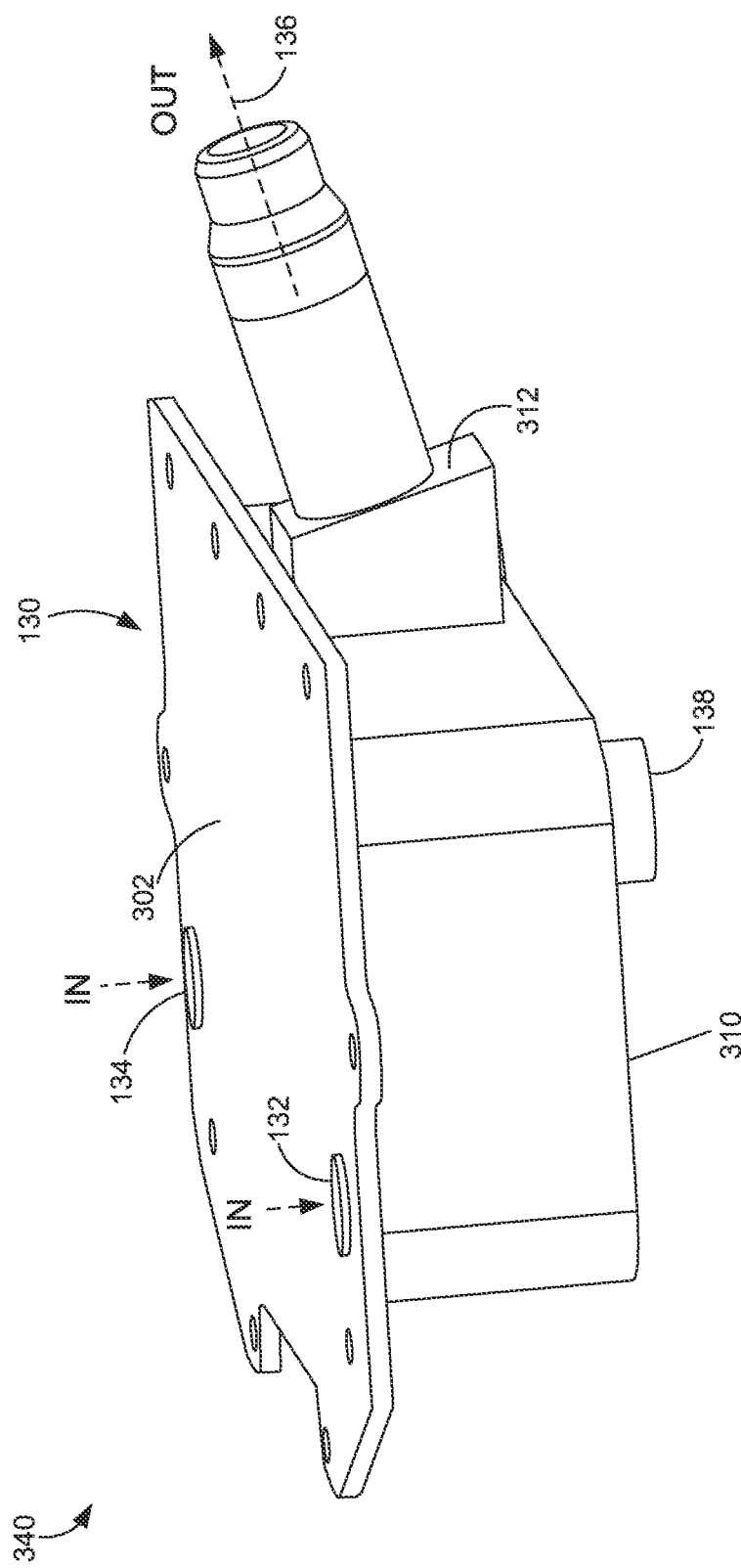
FIG. 3C is another schematic diagram of a side perspective view of an example HEM, in accordance with aspects of the technology described herein.

Next, FIGS. 3A-3C illustrate different views of the HEM 130 in example EV 110. As shown, the HEM 130 includes a plurality of passages through which oil and coolant fluid are transported. First, FIG. 3A, illustrates a top perspective view 300 of the HEM 130. On the first surface 302, the coolant inlet 1 (132) and coolant inlet 2 (134) are depicted. As seen, both coolant inlet 1 (132) and coolant inlet 2 (134) include openings (or ports) through which the coolant passes through the HEM 130. Coolant fluid enters the HEM from the inverter 160. Once the coolant fluid passes into the coolant inlets 1 and 2 (132 and 134) the coolant may pass through a one or more passages (not shown) that lie below the first surface 302. The coolant passes through the passages generally in the direction illustrated by arrows 304 and 306, eventually meeting at the coolant outlet 136, where the coolant exits the HEM 130 via coolant outlet 136a. The coolant fluid absorbs heat from the propulsion system of the vehicle. When the coolant fluid exits the HEM 130, it travels to another component, such as a radiator or an air conditioner, where it is cooled. The coolant fluid will then return to the inverter 160 and repeat the same cycle traveling from the inverter 160 to the coolant inlets 132 and 134. In one aspect, such as shown in FIG. 3a, the coolant outlet 136a is depicted on the first surface 302. However, it is contemplated that in other aspects, the actual opening from which the coolant exits may be located on a third surface 312 (as shown in FIGS. 3B and 3C at 150). However, it is contemplated that in some embodiments, the coolant outlet 136a exit may be located on the first surface 302.

In addition, the single oil inlet 138a and two oil outlets 140a and 142a are also depicted in FIG. 3A on the first surface 302 for illustration purposes. However, as will be discussed, the actual location may be, as illustrated in FIG. 3B, on the second surface 310. It is contemplated in some embodiments, the coolant inlets 132, 134 and the coolant outlet 136 and/or the oil inlet 138 and oil outlets 140 and 142 may be located on the first surface 302, second surface 310, third surface 312 (as shown in FIG. 3C), or the like. In general, oil will enter the HEM 120 via the oil inlet 138 and exit via one of the oil outlets 140 and 142. Coolant fluid will enter the HEM 130 via coolant inlet 1 (132) and coolant inlet 2 (134) and exit the HEM 130 via coolant outlet 136, as shown in FIG. 3B.

The HEM 130 is further depicted in FIG. 3B, which illustrates a bottom perspective view 320 of the HEM 130. In this image, the location of the oil inlet 138 on the second surface 310 of the HEM 130 is depicted. As shown, when oil enters through the oil inlet 138, it travels through a plurality of passages (not shown) which are located between the first surface 302 and the second surface 310. The oil enters the oil inlet 138 from the gear box 162. The oil passes through the oil inlet 138 and is then split between a first plurality of passages which end with the first oil outlet 140 and a second plurality of passages (not shown) that end with the second oil outlet 142. In other words, oil enters into the oil inlet 138 on the second surface 310 of the HEM 130 and either travels in the direction of arrow 307 via a plurality of passages and out the first oil outlet 140 or travels in the direction of the arrow 305 via the plurality of passages and out the second oil outlet 142. While not shown, the plurality of passages through which the oil and coolant travel through are located between the first surface 302 and the second surface 310 of the HEM 130. It is contemplated that any suitable coolant and oil passageways may be used. For example, passageways may be linear, serpentine, or any shape that provides the desired heat exchange results. Oil can pass through the oil inlet 138 and split between the plurality of passages, such that a first portion of the oil exits via the first oil outlet 140 and the remaining second portion exits via the second oil outlet 142. When the oil travels through the plurality of passages from the oil inlet 138 to the oil outlets 140 and 142, the oil is cooled down. Upon exiting from the first oil outlet 140 or the second oil outlet 142, the oil returns to the gearbox 162.

Further, FIG. 3B also illustrates the previously discussed flow of the coolant within the HEM 130. As discussed, the coolant inlets 132 and 134 are located on the first surface 302, but depicted via dashed circles as coolant inlets 132a and 134a on the second surface 310 to illustrate their location. As discussed, once the coolant passes into the coolant inlets 132a and 134a, the coolant travels via the plurality of coolant passages through the HEM 130 and out of the coolant outlet 136, which is located on the third surface 312 in this potential configuration. FIG. 3C more clearly depicts the coolant inlets 132 and 134 on the first surface 302 and the coolant outlet 136 on the third surface 312. As seen in FIGS. 3A and 3B, the passageways of the coolant and oil through the HEM 130 cross one another, resulting in a dual-cross flow system. The cross-flow of the heating and cooling lubricants results in increased counter-flow and better temperature management in the EV 110. The configuration of HEM 130 results in the dual-cross flow between each of the two coolant inlets, the one coolant outlet, the one oil inlet and the two oil outlets.

In FIG. 3C, another side perspective view 340 of the HEM 130 is illustrated. The opening for the coolant to enter coolant inlet 1 (132) and coolant inlet 2 (134) is depicted. The coolant may enter the plurality of passages via coolant inlet 1 (132) and coolant inlet 2 (134) on the first surface 302. Coolant will travel through the plurality of passages (not shown) beneath the first surface 302 toward the coolant outlet 136. At the coolant outlet 136, the coolant from both the first coolant inlet 1 (132) and coolant inlet 2 (134) comes together to exit via the coolant outlet 136. It is contemplated that when the coolant from the two coolant inlets 132 and 134 meet at the coolant outlet 136, the coolant from both inlets 132 and 134 may remain separated or mix prior to exiting via the coolant outlet.

Figure 4:
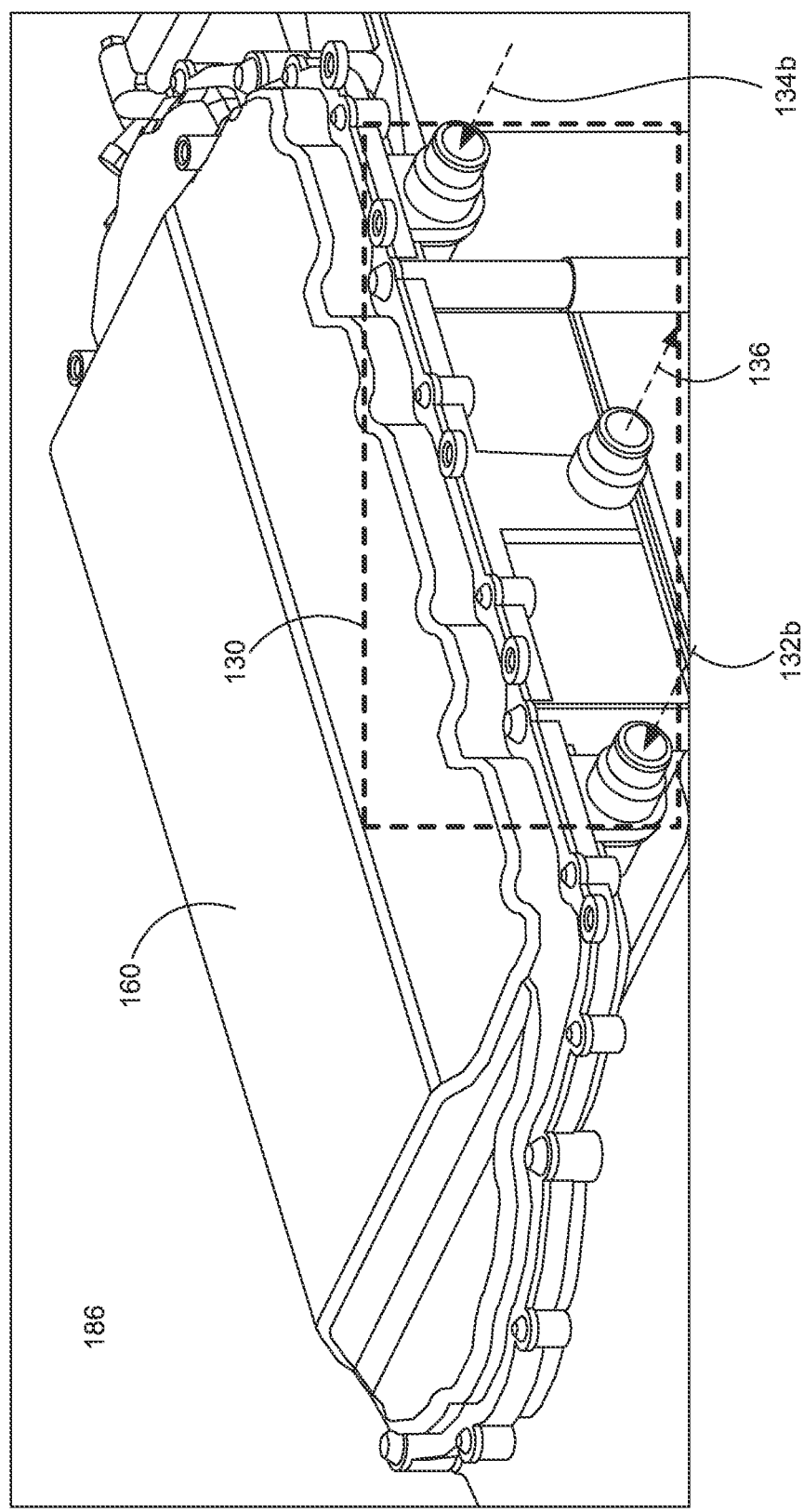
FIG. 4 is another schematic diagram of top isometric view of an example EV comprising the HEM positioned below an inverter with two coolant inlets and one coolant outlet, in accordance with aspects of the technology described herein.

FIG. 4 illustrates another schematic diagram of side perspective view 400 of an example EV 110 comprising the HEM 130 positioned below an inverter 160 with two coolant inlets 132b and 134b and one coolant outlet 136. Unlike the previous figures, FIG. 4 illustrates how the HEM 130 fits within the EV's interior space. The inverter 160 is shown above the HEM 130. Additionally, in FIG. 4, the two coolant inlets 132b and 134b are shown on a side surface of the HEM 130 rather than a first surface 302 of the HEM 130 as previously described. It is contemplated that the configuration of the location of the coolant inlets 132b and 134b, coolant outlet 136, oil inlet 138, and oil outlets 140 and 142 may vary and may be located on any suitable surface of the HEM 130 in any suitable configuration.

Although certain positions and arrangements of the components of the HEM 130 are provided herein, it should be understood that the components may be arranged in any suitable alternative or additional configuration(s), such as other positions, other arrangements, or may even be omitted from the HEM 130 in some embodiments.

Figure 5:
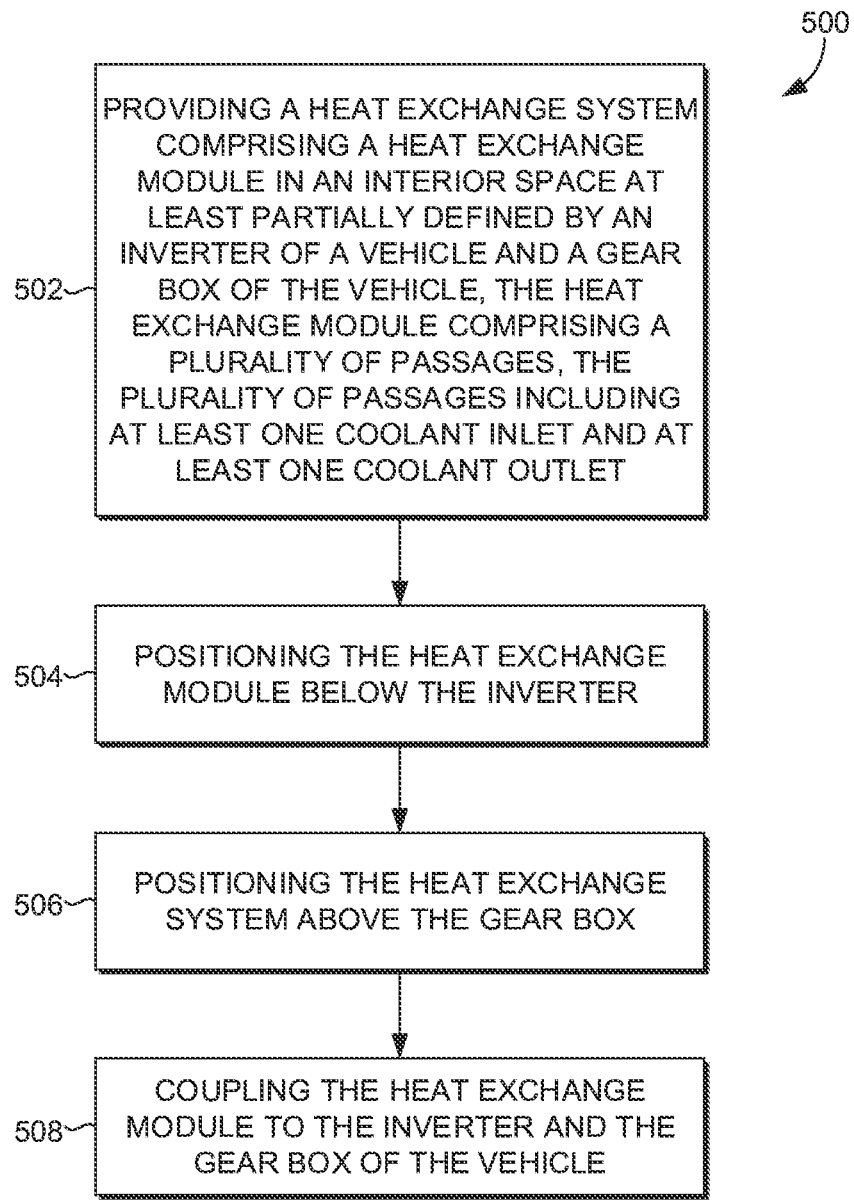
FIG. 5 is a flow diagram of an example method for assembling an HEM, in accordance with aspects of the technology described herein.

FIG. 5 is a flow diagram of an example process 500 (e.g., method) for assembling the HEM 130 of FIG. 1, in accordance with aspects of the technology described herein. It should be understood that process 500 may be performed by any suitable device or person. Process 500 includes providing (block 502) providing a heat exchange system comprising a heat exchange module in an interior space at least partially defined by an inverter of a vehicle and a gear box of the vehicle, the heat exchange module comprising a plurality of passages, the plurality of passages including at least one coolant inlet and at least one coolant outlet. While the current disclosure discusses the HEM 130 being located in the space defined by the inverter and gearbox, it is contemplated that the HEM 130 may be located in any other suitable location within the interior space of a vehicle. Example process 500 further includes positioning the heat exchange module below the inverter (block 504). Example process 500 also includes positioning the heat exchange module above the gear box (block 506). Additionally, the example process 500 includes coupling the heat exchange module to the inverter and the gear box of the vehicle (block 508). The process 500 may include any additional or alternative steps, in addition to or in lieu of those illustrated in process 500.

Additional Support for Detailed Description of the Disclosed Subject Matter

Example Electric Vehicle System

Figure 6:
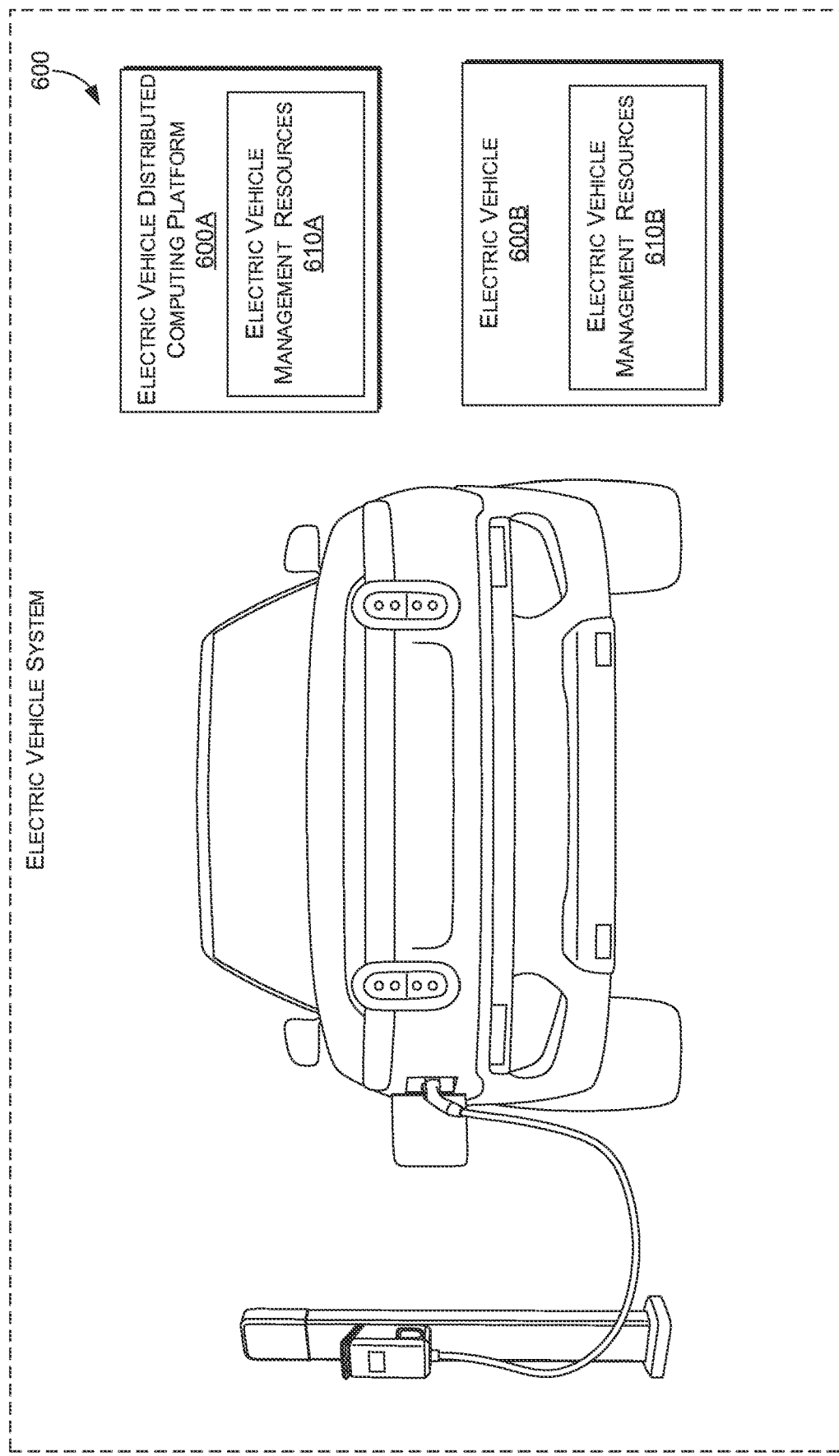
FIG. 6 is a schematic diagram of an example electric vehicle system, in accordance with aspects of the technology described herein.

With reference to FIG. 6, FIG. 6 illustrates an example EV system 600 in which implementations of the present disclosure may be employed. In particular, FIG. 600 shows a high level architecture of an example electric vehicle distributed computing platform 600A and electric vehicle 600B having electric vehicle management resources 610A and electric vehicle management resources 610B, respectively, that support the functionality described herein. The electric vehicle system 600 can host a technical solution environment, or a portion thereof.

The electric vehicle distributed computing platform 600A includes electric vehicle management resources 610A that provide and support electric vehicle distributed computing systems and operations. Electric vehicle distributed computing platform 600A can run cloud services across different data centers and geographic regions. Typically, the electric vehicle distributed computing platform 600A acts to store data or run service applications in a distributed manner. For example, a service application can be supported by a computing environment (e.g., host, node, and virtual machine) and resources (e.g., hardware resources and software resources) that can configure the service application; and a client device may be linked to a service application and configured to issue commands to the service application. Communications in the electric vehicle distributed computing platform 600A are performed through a virtual Internet Protocol (IP) and over a network (not shown), which may include, without limitation, one or more local area networks (LANs) and/or wide area networks (WANs).

The electric vehicle 600B includes electric vehicle management resources 610B that provide and support electric vehicle systems and operations. Electric vehicle 600 can refer to a vehicle that uses electric power. The electric vehicle 600 can be built on a configuration for an automotive chassis used for automotive platforms of battery electric vehicles. The configuration can include a base structure that houses the batteries, electric motors, and other electronic components of the electric vehicle, such as those described herein. By way of example, the electric vehicle can include a steering system, brake sensor system, a HEM 130 (FIG. 1) and controller systems.

Controllers can include one or more systems on chips (SoCs) that may provide signals to one or more components and systems of the vehicle. For example, controllers can support a steering system, braking system, one or more onboard computing devices, artificial intelligence functionality (e.g., computer vision), infotainment functionality, global navigation satellite systems and sensors (e.g., Global Positioning System sensors, RADAR sensors, LIDAR sensors) and inertial measurement unit (IMU) sensors (e.g., accelerometers, gyroscopes). Controllers may receive inputs (e.g., represented by input data) from and provide outputs (e.g., represented by output data, display data, etc.) via a human-machine interface (HMI) display and other components of the electric vehicle.

The electric vehicle further includes a network interface which may use one or more wireless antenna(s) and/or modem(s) to communicate over one or more networks. For example, the network interface may be capable of communication over LTE, WCDMA, UMTS, GSM, CDMA2000, etc. The wireless antenna(s) may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown. The various blocks are shown with lines for the sake of conceptual clarity, and other arrangements of the described components and/or component functionality are also contemplated. FIG. 6 is merely meant to be illustrative of an example electric vehicle and electric vehicle system that can be used in connection with one or more embodiments of the present disclosure.

Example Computing Environment

Having briefly described an overview of embodiments of the present disclosure, an example operating environment in which embodiments of the present disclosure may be implemented is described below in order to provide a general context for various aspects of the present disclosure. Aspects of the disclosed embodiments may be practiced in a variety of system configurations. Aspects of the disclosed embodiments may also be practiced in distributed computing environments where tasks are performed by remote-processing devices that are linked through a communications network.

Figure 7:
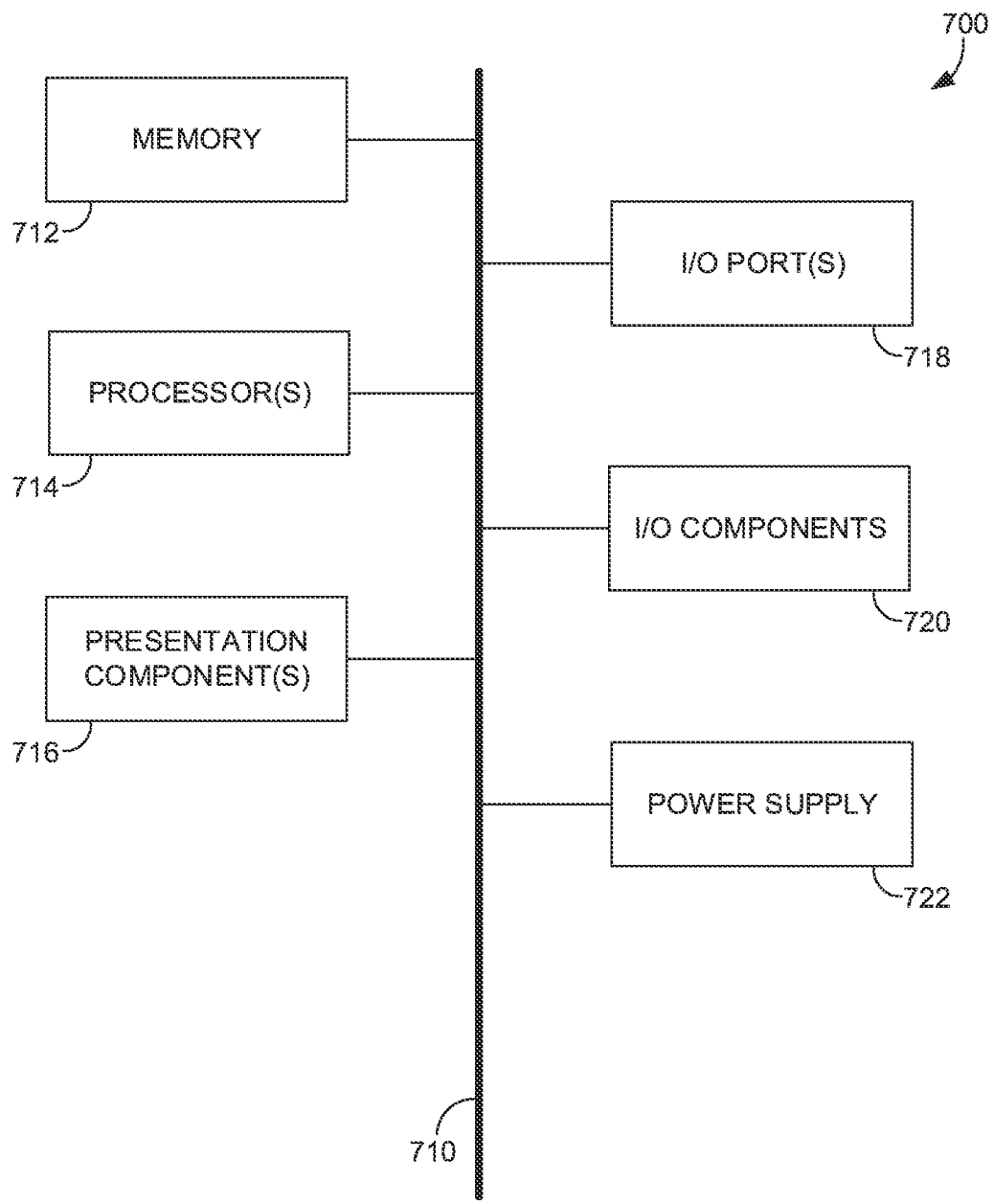
FIG. 7 is a block diagram of an exemplary computing environment suitable for use in implementing aspects of the technology described herein.

With reference to FIG. 7, computing device 700 (which may be a part of the HEM assembly 100) includes bus 710 that directly or indirectly couples the following devices: memory 712, one or more processors 714, one or more presentation components 716, input/output ports 718, input/output components 720, and illustrative power supply 722. The computing device 700 may correspond to the control system 180 of the EV 110 of FIG. 1. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present disclosure. Distinction is not made between such categories as "workstation," "controller," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may include computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving" or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A heat exchange system within a vehicle, the heat exchange system comprising:
   a heat exchange module (HEM) positioned between an inverter of the vehicle and a gear box of the vehicle, the heat exchange module comprising:
      a first coolant inlet, a second coolant inlet, and a coolant outlet, wherein the first coolant inlet and the second coolant inlet are connected to the coolant outlet; and
   a first oil outlet, a second oil outlet, and an oil inlet, wherein the first oil outlet and the second oil outlet are connected to the oil inlet, and the HEM is configured to direct oil through i) a first plurality of passages, in a first direction, to the first oil outlet ii) a second plurality of passages, in a second direction different from the first direction, to the second oil outlet.

2. The heat exchange system of claim 1, wherein the first coolant inlet and the second coolant inlet are connected to the inverter and located on a first surface of the heat exchange module.

3. The heat exchange system of claim 2, wherein coolant fluid from the first coolant inlet and the second coolant inlet are combined to exit the HEM via the coolant outlet, wherein the coolant outlet is located on a third surface.

4. The heat exchange system of claim 3, wherein the oil inlet, the first oil outlet, and the second oil outlet are connected to the gear box of the vehicle and located on a second surface, wherein the second surface is opposite the first surface.

5. The heat exchange system of claim 1, wherein the oil is directed externally to the HEM to one of the first plurality of passages and the second plurality of passages.

6. The heat exchange system of claim 1, wherein:
   a plurality of coolant passages connect the first coolant inlet and second coolant inlet to the coolant outlet, and
   the coolant fluid travels through the plurality of coolant passages and exits the heat exchange system via the coolant outlet.

7. The heat exchange system of claim 1, wherein a plurality of oil passages connect the oil inlet to the first oil outlet and the second oil outlet.

8. The heat exchange system of claim 7, wherein oil travels into the heat exchange module through the oil inlet.

9. The heat exchange system of claim 8, wherein the oil travels through the plurality of oil passages and exits the heat exchange system via the first oil outlet and the second oil outlet.

10. The heat exchange system of claim 9, wherein a split path of the oil lowers pressure drops within the heat exchange system from a first pressure to a second pressure.

11. The heat exchange system of claim 1, wherein the heat exchange system has dual-cross flow between each of the first coolant inlet and the second coolant inlet, the coolant outlet, the oil inlet, the first oil outlet, and the second oil outlet.

12. A heat exchange system within a vehicle, the heat exchange system comprising:
   a heat exchange module (HEM) coupled to an inverter of the vehicle and a gear box of the vehicle; and
   the heat exchange module comprising;
      a first coolant inlet, a second coolant inlet, and an oil inlet positioned between the first coolant inlet and the second coolant inlet; and
   a first oil outlet, a second oil outlet, and a coolant outlet positioned between the first oil outlet and the second oil outlet,
      wherein:
         oil is configured to be directed, via the HEM, from the oil inlet to the first oil outlet and the second oil outlet, and
         coolant is configured to be directed, via the HEM, to the coolant outlet from the first coolant inlet and from the second coolant inlet.

13. The heat exchange system of claim 12, wherein the first coolant inlet is located on a first surface and the coolant outlet is located on a third surface.

14. The heat exchange system of claim 13, wherein the first coolant inlet and the coolant outlet are connected via a plurality of passages.

15. The heat exchange system of claim 14, further comprising at least one oil inlet and at least one oil outlet.

16. The heat exchange system of claim 15, wherein the at least one oil inlet and the at least one oil outlet are located on a second surface opposite the first surface and are connected via a plurality of passages.

17. The heat exchange system of claim 12, wherein the heat exchange module is positioned below the inverter and above the gear box of the vehicle.

18. A vehicle comprising:
   a heat exchange system, the heat exchange system comprising:
      a heat exchange module (HEM) positioned between an inverter of the vehicle and a gear box of the vehicle;
      a first coolant inlet, a second coolant inlet, and a coolant outlet, wherein the first coolant inlet and the second coolant inlet are connected to the coolant outlet; and
      a first oil outlet, a second oil outlet, and an oil inlet, wherein the first oil outlet and the second oil outlet are connected to the oil inlet, and the HEM is configured to direct oil through i) a first plurality of passages, in a first direction, to the first oil outlet ii) a second plurality of passages, in a second direction different from the first direction, to the second oil outlet.

19. The vehicle of claim 18, wherein the first coolant inlet and the second coolant inlet are connected to the inverter.

20. The vehicle of claim 19, wherein the first oil outlet and the second oil outlet are connected to the gear box.

* * * * *